United States Patent

[11] 3,607,826

| [72] | Inventors | Willard Henry Wharton<br>Lake Jackson;<br>Wayne Cole Brady, Angleton; Michael<br>Calvin McGaugh, Angleton, all of Tex. |
|---|---|---|
| [21] | Appl. No. | 752,721 |
| [22] | Filed | Aug. 14, 1968 |
| [45] | Patented | Sept. 21, 1971 |
| [73] | Assignee | The Dow Chemical Company<br>Midland, Mich. |

[54] STABILIZATION OF ETHYLENE POLYMERS
7 Claims, No Drawings

[52] U.S. Cl. .................................................... 260/41 R,
260/45.7 R, 260/45.85, 260/45.95
[51] Int. Cl. ...................................................... C08f 45/08,
C08f 45/56, C08f 45/58

[50] Field of Search ........................................... 260/41,
45.85, 45.95, 45.7

[56] References Cited
UNITED STATES PATENTS

| 3,298,996 | 1/1967 | Nelson et al. ................. | 260/45.85 |
| 3,409,583 | 11/1968 | Davis et al. .................... | 260/45.85 |

*Primary Examiner*—Donald E. Czaja
*Assistant Examiner*—V. P. Hoke
*Attorneys*—Griswold and Burdick, Lester J. Dankert, Richard G. Waterman and Benjamin G. Colley ABSTRACT: Ethylene polymer of increased stability against oxidative degradation are described wherein a stabilizing amount of carbon black, a dithiodibenzoic acid, and an alkylated hydroxy anisole are incorporated into the polymer.

STABILIZATION OF ETHYLENE POLYMERS

GENERAL STATEMENT OF THE INVENTION

This invention relates to the stabilization of ethylene polymers. More specifically, it relates to ethylene polymers stabilized against oxidation.

Ethylene polymers and copolymers are well known to the art and have found broad utility. However, these polymers are subject to oxidative degradation, and in practically all uses for these materials, it is necessary to provide an antioxidant in the polymer composition. Unless antioxidants are provided, the usefulness of these plastics is markedly reduced.

BACKGROUND OF THE INVENTION

Numerous materials either singly or in combination with others have either been proposed or used for ethylene polymers. An example is shown in U.S. Pat. No. 3,298,996 to Nelson. While some of these antioxidants are moderately successful, research is continuing in search of better antioxidants to prevent oxidative degradation of these very useful plastic materials.

GENERAL DESCRIPTION

According to the present invention, the stability of ethylene polymers to oxidative degradation is increased by incorporating in the polymer a small but effective amount of carbon black, a dithiodibenzoic acid having the formula.

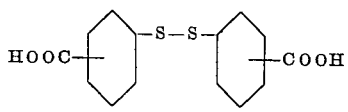

and an alkylated hydroxy anisole having the formula

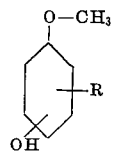

where R represents one or more alkyl groups containing one to eight carbon atoms per group.

Ordinary carbon blacks including channel blacks, lamp blacks and acetylene blacks having particle sizes between about 40 and 5,000 angstrom units (A) are suitable for use in this invention and carbon blacks having particle sizes between 40 and 250 A are preferred.

Illustrative examples of suitable dithiodibenzoic acids employed in the present invention include 2,2'-dithiodibenzoic acid, 2,4'-dithiodibenzoic acid, 3,3'-dithiodibenzoic acid, 3,4'-dithiodibenzoic acid and the like.

Illustrative examples of alkylated hydroxy anisoles useful in the practice of this invention include 2-methyl-4-methoxyphenol, 3-methyl-3methoxyphenol, 2-ethyl-4-methoxyphenol, 3-ethyl-4-methoxyphenol, 2-propyl-4-methoxyphenol, 3-propyl-4-methoxyphenol, 2-butyl-4-methoxyphenol, 3-butyl-4-methoxyphenol, 2-tertiary butyl-4-methoxyphenol, 3-t-butyl-4-methoxyphenol, 2-octyl-6-methyl-4-methoxyphenol and 2-t-butyl-5-methyl-3-methoxyphenol.

Ethylene polymers which may be stabilized against oxidative degradation according to the present invention include polyethylene of the so-called, low, high or intermediate density type, copolymers of a major proportion of ethylene and a minor proportion of another α-olefin such as propylene, 1-n-butene, 3-methyl-1-butene, 1-n-pentene, 4-methyl-1-pentene, 1-n-hexene and any other ethylenically unsaturated monomers capable of copolymerizing with ethylene. The term "polymers" is used herein to designate both homopolymers and copolymers.

The amount of dithiodibenzoic acid, alkylated hydroxy anisole, and carbon black employed in ethylene polymer compositions in accordance with the invention can be widely varied, the stabilizing amounts of the individual stabilizer components usually varying with the particular use to which the ethylene polymer is to be put. Concentrations of carbon black ranging from about 1 to about 5 percent by weight in combination with from about 50 to 5,000 parts per million p.p.m. of the dithiodibenzoic acid and about 50 to about 5,000 parts per million of the alkylated hydroxy anisole are generally used. Concentrations of about 2 to about 3 percent by weight of the carbon black, about 100 to about 3,000 p.p.m. of the dithiodibenzoic acid and about 100 to about 1,000 p.p.m. of the alkylated hydroxy anisole are preferred. The foregoing percentages and parts by million are based on the weight of the polymer.

The stabilizer combination of the invention can be incorporated or blended into ethylene polymer compositions by any of the conventional methods used for blending such materials into resins or plastics. Typical of such methods that can be suitably employed include milling, as on heated rolls, screw extruders, Banbury mixers and the like, deposition from solvents as by spraying or washing and dry blending. The stabilizers of the invention can be incorporated separately or together into the ethylene polymer composition. Ethylene polymers stabilized in accordance with the invention can be cast, extruded, rolled or molded into sheets, rods, tubes, piping, filaments and other shaped articles, including widely used films of the polymer of from about 0.1 to 100 mils in thickness. The present ethylene polymer composition can be used for coating paper, cloth, wire, metal foil, glass fiber fabrics, synthetic and natural textiles and other such materials. Likewise, small amounts of other additives such as are commonly added to ethylene polymers for specific uses can be employed. Also, other stabilizers, inhibitors or the like including plasticizers, lubricants, dyes, pigments, fillers and the like can be employed in the present ethylene polymer compositions, if desired. The incorporation of the dithiodibenzoic acid, alkylated anisole, and the carbon black in the ethylene polymer produces a stabilizing effect that is substantially greater than the additive effect of these compounds individually as will be illustrated in the following example.

EXAMPLE

Samples of polyethylene having a density of 0.918 gram per cubic centimeter and a Melt Index of 0.2 were separately dry blended with varying concentrations of 2, 2'-dithiodibenzoic acid (DTDBA), butylated hydroxy anisole (BHA) (a mixture of 2- and 3,t-butyl-4-methoxy phenols) and carbon black having an average particle size of 80 A. The various blends were plasticized and extruded at 350° F. through a 2½-inch Farrell Birmingham extruder into strands, quenched in a water bath at 70° F. and pelletized.

The antioxidant efficiency of the stabilizer combination was determined by measuring the "induction period" of the stabilized polyethylene. The "induction period" was determined in the following manner: A 0.2 gram sample of the stabilized polyethylene was charged to an oxygen bomb equipped with a differential volume recorder and maintained at 350° F. under an atmosphere of pure oxygen (at an initial pressure of 15 p.s.i.a.). The time vs. oxygen volume curve was then examined and the induction period, i.e. the time at which oxygen volume began to drop, was determined; the loss of gaseous $O_2$ being due to the adsorption (reaction) of $O_2$ by the polyethylene sample.

For purposes of contrast, polyethylene samples prepared in a manner similar to the above samples with the exception that all or two of the three stabilizer components were omitted from the polyethylene resin were also evaluated for resistance to oxidation as control samples.

The induction periods of the polyethylene resin stabilized according to the present invention (sample No. 1) as well as the control samples (sample Nos. 2, 3, 4 and 5) are recorded in the table below.

TABLE

| Sample Number | Composition of polyethylene resin | | | Induction period, minutes in O at 350° F. |
|---|---|---|---|---|
| | Carbon black (percent by wt.) | DTDBA (p.p.m.) | BHA (p.p.m.) | |
| 1 | 2.65 | 1,000 | 250 | 214 |
| 2 | | 1,000 | | 5.0 |
| 3 | 2.65 | | | 18.0 |
| 4 | | | 250 | 26.0 |
| 5 | | | | 2.3 |

It can be seen from the table that unmodified polyethylene (sample No. 5) starts to react with oxygen after only 2.3 minutes, and the stabilizer combination of the present invention (sample No. 1) effects over a 90-fold increase in the induction period, i.e., the time during which there is no reaction between the polyethylene and oxygen and is substantially greater than the expected or predictable aggregative effect of similar concentrations of the individual stabilizer components as illustrated by sample Nos. 2, 3 and 4.

What is claimed is:

1. A polymer composition of increased stability against oxidative degradation comprised of an ethylene polymer and a stabilizing amount of carbon black, a dithiodibenzoic acid having the formula

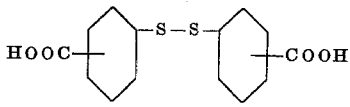

and an alkylated hydroxy anisole having the formula

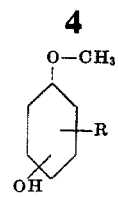

where R is one or more alkyl groups containing one to eight carbon atoms per group.

2. The composition of claim 1 wherein the dithiodibenzoic acid is 2,2'-dithiodibenzoic acid.

3. The composition of claim 1 wherein the alkylated hydroxy anisole is a t-butyl-4-methoxy-phenol.

4. The composition of claim 1 wherein the ethylene polymer is polyethylene.

5. The composition of claim 2 wherein the 2,2'-dithiodibenzoic acid is present in amounts ranging from about 50 to 5,000 parts per million, the carbon black is present in amounts ranging from about 1 to about 5 percent by weight, and the alkylated hydroxy anisole is present in amounts ranging from about 50 to about 5,000 parts per million, all parts being based on the weight of the polymer.

6. A polyethylene composition of increased stability against oxidative degradation comprised of polyethylene, about 2 to about 3 percent by weight of carbon black having a particle size between 40 and 5,000 Angstrom units, about 100 to about 3,000 parts per million of 2,2'-dithiodibenzoic acid, and about 100 to about 1,000 parts per million of a t-butyl-4-methoxyphenol.

7. A polyethylene composition as set forth in claim 6 wherein the composition is comprised of 2.65 percent carbon black having an average particle size of 80 Angstrom units, 1,000 parts per million of dithiodibenzoic acid and 250 parts per million of a mixture of 2 and 3 t-butyl-4-methoxy-phenol.